(12) United States Patent
Kim et al.

(10) Patent No.: US 12,215,256 B2
(45) Date of Patent: Feb. 4, 2025

(54) DRY ADHESIVE COMPRISING A SHAPE MEMORY POLYMER FOR ATTACHMENT TO A FLEXIBLE ADHEREND

(71) Applicant: The Board of Trustees of the University of Illinois, Urbana, IL (US)

(72) Inventors: Seok Kim, Pohang (KR); Placid M. Ferreira, Champaign, IL (US); ChangHee Son, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days.

(21) Appl. No.: 17/710,391

(22) Filed: Mar. 31, 2022

(65) Prior Publication Data

US 2022/0315805 A1 Oct. 6, 2022

Related U.S. Application Data

(60) Provisional application No. 63/170,392, filed on Apr. 2, 2021.

(51) Int. Cl.
*C09J 7/35* (2018.01)
*C08L 63/00* (2006.01)
(Continued)

(52) U.S. Cl.
CPC ............... *C09J 7/35* (2018.01); *C08L 63/00* (2013.01); *C09J 5/06* (2013.01); *C09J 7/00* (2013.01);
(Continued)

(58) Field of Classification Search
None
See application file for complete search history.

(56) References Cited

U.S. PATENT DOCUMENTS 8,236,226 B2 8/2012 Sherman et al.
8,618,238 B2 * 12/2013 Xie .................. C09J 163/00
528/98

(Continued)

FOREIGN PATENT DOCUMENTS

KR 1020210083538 A * 7/2021 ........... C08G 61/126

OTHER PUBLICATIONS

Mengyan Wang et al., "High Stretchable Shape Memory Self-Soldering Conductive Tape with Reversible Adhesive Switched by Temperature", Nano-Micro Letters, Springer, May 11, 2021, pp. 1-11 (Year: 2021).*

(Continued)

*Primary Examiner* — Anish P Desai
(74) *Attorney, Agent, or Firm* — Crowell & Moring LLP

(57) ABSTRACT

A dry adhesive for attachment to a flexible adherend comprises a shape memory polymer having a glass transition temperature ($T_g$) above 25° C. and a compliant backing layer attached to the shape memory polymer. The shape memory polymer is configured to form a conformal and/or hermetic contact with a flexible adherend at temperatures at or above the $T_g$ and to retain the conformal and/or hermetic contact during flexing of the flexible adherend at temperatures below the $T_g$.

11 Claims, 12 Drawing Sheets
(2 of 12 Drawing Sheet(s) Filed in Color)

(51) Int. Cl.
  C09J 5/06 (2006.01)
  C09J 7/00 (2018.01)
  C09J 7/22 (2018.01)
  C09J 163/00 (2006.01)
(52) U.S. Cl.
  CPC .............. C09J 7/22 (2018.01); C08L 2201/12
      (2013.01); C09J 163/00 (2013.01); C09J
      2203/334 (2013.01); C09J 2203/358
      (2020.08); C09J 2301/122 (2020.08); C09J
      2301/304 (2020.08); C09J 2301/502
      (2020.08); Y10T 428/28 (2015.01)

(56) References Cited

U.S. PATENT DOCUMENTS

| | | | |
|---|---|---|---|
| 9,412,727 | B2 | 9/2016 | Menard et al. |
| 10,046,353 | B2 | 8/2018 | Kim et al. |
| 10,377,922 | B2* | 8/2019 | Kim .................. H05B 3/145 |
| 10,533,080 | B2 | 1/2020 | Kim et al. |
| 2006/0098315 | A1* | 5/2006 | Mabbott .............. B44C 1/1716 359/883 |
| 2015/0352586 | A1 | 12/2015 | Kim et al. |
| 2018/0100046 | A1 | 4/2018 | Kim et al. |
| 2018/0207641 | A1 | 7/2018 | Kim et al. |
| 2019/0316007 | A1 | 10/2019 | Kim et al. |
| 2020/0347272 | A1 | 11/2020 | Kim et al. |
| 2021/0197517 | A1* | 7/2021 | Kim .................. H10K 50/84 |
| 2021/0363388 | A1 | 11/2021 | Kim et al. |

OTHER PUBLICATIONS

ChangeHee Son et al., "Dual Adaptation of a Flexible Shape Memory Polymer Adhesive", ACS Applied Materials and Interfaces, pp. 27656-27662, published Jun. 2, 2021 (Year: 2021).*
A blog title "What Standard Printer Ink Is Made Of?" from "1ink.com", retrived on Jul. 18, 2024 (Year: 2024).*
ASTM International. D1876-08 Standard Test Method for Peel Resistance of Adhesives (T-Peel Test). West Conshohocken, PA; ASTM International. (2015), 3 pp.
Autumn et al, "Evidence for van Der Waals Adhesion in Gecko Setae," Proc. Natl. Acad. Sci. U. S. A. 99 (19) (2002), pp. 12252-12256.
Baik et al., "A Wet-Tolerant Adhesive Patch Inspired by Protuberances in Suction Cups of Octopi," Nature 546 (2017), pp. 396-400.
Bartlett et al., Looking beyond Fibrillar Features to Scale Gecko-like Adhesion. Adv. Mater. 24 (8) (2012), pp. 1078-1083.
Behl et al., "A. Multifunctional Shape-Memory Polymers,"Advanced Materials 22 (2010), pp. 3388-3410.
Behl et al, "Reversible Bidirectional Shape-Memory Polymers," Adv. Mater. 25 (32) (2013), pp. 4466-4469.
Cao et al., "A Blister Test for Interfacial Adhesion of Large-Scale Transferred Graphene," Carbon 69 (2014), pp. 390-400.
Carlson et al., "Active, Programmable Elastomeric Surfaces with lunable Adhesion for Deterministic Assembly by Transfer Printing," Advanced Functional Materials, 22 (2012), pp. 4476-4484.
Eisenhaure et al., "An Internally Heated Shape Memory Polymer Dry Adhesive," Polymers, 6 (8) (2014), pp. 2274-2286.
Eisenhaure et al., "High-Strain Shape Memory Polymers as Practical Dry Adhesives," Int. J. Adhes. Adhes. 81 (2018), pp. 74-78.
Eisenhaure et al., "Laser-Driven Shape Memory Effect for Transfer Printing Combining Parallelism with Individual Object Control," Adv. Mater. Technol, 1 (7) (2016), 11 pp.
Eisenhaure et al, "Microstructured Shape Memory Polymer Surfaces with Reversible Dry Adhesion," ACS Appl. Mater. Interfaces, 5 (16) (2013), pp. 7714-7717.
Eisenhaure et.al, "The Use of Shape Memory Polymers for MEMS Assembly," J. Microelectromechanical Syst. 25 (1) (2016), pp. 69-77.

Gall et al., "Shape-Memory Polymers for Microelectromechanical Systems," J. Microelectromechanical Syst. 13 (3) (2004), pp. 472-483.
Ge et al., "Multimaterial 4D Printing with Tailorable Shape Memory Polymers," Sci. Rep. 6 (1) (2016), pp. 1-11.
Glick et al., "Soft Robotic Gripper with Gecko-Inspired Adhesive," IEEE Robot. Autom. Lett. 3 (2) (2018), pp. 903-910.
Huang et al., "Direct Laser Writing-Based Programmable Transfer Printing via Bioinspired Shape Memory Reversible Adhesive," ACS Appl. Mater. Interfaces 8 (51) (2016), pp. 35628-35633.
Huang et al., "Water-Driven Programmable Polyurethane Shape Memory Polymer: Demonstration and Mechanism," Appl. Phys. Lett. 86 (11), (2005), pp. 1-3.
Kim et al., "Biologically Inspired Polymer Microfibers with Spatulate Tips as Repeatable Fibrillar Adhesives," Appl. Phys. Lett. 89 (26) (2006), pp. 261911-261911-3.
Kim et al, "Component Assembly with Shape Memory Polymer Fastener for Microrobots," Smart Mater. Struct. 2014, 23 (1) (2014) pp. 015011-1 to 015011-12.
Kim et al., "Smooth Vertical Surface Climbing with Directional Adhesion," IEEE Trans. Robot. 24 (1) (2008), pp. 65-74.
Kim et al., "Micro-LEGO for MEMS," Micromachines, 10 (267) (2019), pp. 1-24.
Koerner et al., "Remotely actuated polymer nanocomposites-stress-recovery of carbon-nanotube-filled thermoplastic elastomers," Nature Materials 3 (2004) pp. 115-120.
Kunzelman et al., "Shape Memory Polymers with Built-in Threshold Temperature Sensors," J. Mater. Chem. 18 (10) (2008), pp. 1082-1086.
Lan et al., "Fiber Reinforced Shape-Memory Polymer Composite and Its Application in a Deployable Hinge," Smart Mater. Struct. 18 (2) (2009), 7 pp.
Lee et al., "Uctopus-Insplrea Smart Adhesive Pads for Transfer Printing of Semiconducting Nanomembranes," Adv. Mater. 28 (34) (2016), pp. 7457-7465.
Lee et al., "Study of Electroactive Shape Memory Polyurethane-Carbon Nanotube Hybrids" Soft Matter 7 (8) (2011), pp. 3801-3807.
Lendlein et al., "Shape-Memory Polymers Ed.; Advances in Polymer Science" Springer Berlin Heidelberg: Berlin, Heidelberg, vol. 226. (2010), pp. 1-218.
Maitland et al., "Photothermal Properties of Shape Memory Polymer Micro-Actuators for Treating Stroke," Lasers Surg. Med. 30 (1) (2002), pp. 1-11.
Mather et al., "Shape Memory Polymer Research," Annu. Rev. Mater. Res. 39 (1) (2009), pp. 445-471.
Meng et al, "A Review of Stimuli-Responsive Shape Memory Polymer Composites," Polymer 54 (2013). pp. 2199-2221.
Michal et al., "Stimuli-responsive reversible two-level adhesion from a structurally dynamic shape-memory polymer." ACS Applied Materials & Interfaces 8 (2016), pp. 11041-11049.
Mohr et al., "Initiation of Shape-Memory Effect by Inductive Heating of Magnetic Nanoparticles in Thermoplastic Polymers," Proc. Natl. Acad. Sci. U. S. A. 103 (10) 2006, pp. 3540-3545.
Park et al., "Droplet Manipulation on a Structured Shape Memory Polymer I Surface." Lab Chip, 17(10), (2017), pp. 1793-1801.
Park et al., "Remotely Triggered Assembly of 3D Mesostructures Through Shape-Memory Effects," Adv. Mater. 31 (52) (2019), 10 pp.
Park et al., "Reversible Underwater Dry Adhesion of a Shape Memory Polymer," Adv. Mater. Interfaces 6 (3) 2019 , 8 pp.
Schmidt et al., "Electromagnetic Activation of Shape Memory Polymer Networks Containing Magnetic Nanoparticles," Macromol. Rapid Commun. 27 (14), (2006), pp. 1168-1172.
Shintake et al., Versatile Soft Grippers with Intrinsic Electroadhesion Based on Multifunctional Pol mer Actuators, Adv. Mater. 28 (2) (2016), pp. 231-238.
Son et al., "A Shape Memory Polymer Adhesive Gripper for Pick-and-Place Applications," 2020 IEEE International Conference on Robotics and Automation (ICRA), (2020), pp. 231-238.
Song et al., "Controllable Load Sharing for Soft Adhesive Interfaces on Three-Dimensional Surfaces," Proc. Natl. Acad. Sci. U. S. A, 114 (22) (2017), pp. E4344-E4353.

(56) References Cited

OTHER PUBLICATIONS

Wang et al., "Cooling-/Water-Responsive Shape Memory Hybrids," *Compos. Sci. Technol.* 72 (10) (2012), pp. 1178-1182.
Wang et al., "Smart Superhydrophobic Shape Memory Adhesive Surface Toward Selective Capture/Release of Microdroplets," *ACS Appl. Mater. Interfaces* 11 (11) (2019), pp. 10988-10997.
Wang et al., "Toe Pads Inspired: In Situ Switchable Superhydrophobic Shape Memory Adhesive Film," *Nanoscale*, 11 (18) (2019), pp. 8984-8993.
Williams et al., "Energy Release Rates for the Peeling of Flexible Membranes and the Analysis of Blister Tests," *Int. J. Fract.* 87 (3) (1997), pp. 265-288.
Wischke et al., "Evaluation of a Degradable Shape Memory Polymer Network as Matrix for Controlled Drug Release," *J. Control. Release*, 138 (3) (2009), pp. 243-250.
Xie et al., "Facile Tailoring of Thermal Transition Temperatures of Epoxy Shape Memory Polymers," *Polymer*, 50 (8) (2009), pp. 1852-1856.
Ze et al., "Magnetic Shape Memory Polymers with Integrated Multifunctional Shape Manipulation," *Adv. Mater.* 32 (4) (2020), 8 pp.

\* cited by examiner

DRY ADHESIVE COMPRISING A SHAPE MEMORY POLYMER FOR ATTACHMENT TO A FLEXIBLE ADHEREND

RELATED APPLICATIONS

The present patent document claims the benefit of priority under 35 U.S.C. § 119(e) to U.S. Provisional Patent Application No. 63/170,392, which was filed on Apr. 2, 2021, and is hereby incorporated by reference in its entirety.

TECHNICAL FIELD

The present disclosure is related generally to shape memory polymers and more particularly to a shape memory polymer (SMP) dry adhesive for attachment to flexible adherends, such as fabrics and polymers.

BACKGROUND

Dry adhesives that require no water, solvent or melt have been widely researched for a variety of applications ranging from household usages to industrial purposes. As an example, a commercial product made of a small piece of paper and a dry adhesive (Post-it®) is a temporary note that can be attached to documents and other dry surfaces. The main strength of this product is that it can be easily attached, removed, and even re-attached to dry surfaces without leaving any residues behind. Thanks to these unique dry adhesive properties it has been popularly used in both homes and offices for several decades. Whereas it utilizes a conventional type of dry adhesive, i.e., a low-tack pressure-sensitive adhesive, which is only capable of bearing a lightweight paper, more recent studies on dry adhesives have shown great advances using different technologies.

Among many different approaches, the gecko adhesives often have an array of micro or submicron-fibers that contact with an adherend and create van der Waals forces. These gecko adhesives usually provide high adhesion forces especially in the shear direction such that they could even be used for wall climbing robots. Nonetheless, the gecko adhesives are vulnerable to peeling because each fiber is not capable of dealing with the large stress concentration at the edge of the adhesive interface. The electroadhesion, which uses the Coulomb (or electrostatic) force, is also an attractive method for gripping various surfaces including deformable objects. However, the electroadhesion is volatile such that the adhesive loses its adhesion once the high voltage supply is stopped. Octopus-inspired adhesives mimicking the suction cups of the octopi show high adhesion even in wet conditions. A pressure-sensitive adhesion pad achieved up to 40 kPa of adhesion strength underwater and up to 180 kPa under oil. Another octopus-inspired adhesive pad is thermally actuated achieving adhesion strength as high as 60 kPa.

Over the aforementioned approaches, there have also been significant efforts to design dry adhesives using shape memory polymers (SMPs), which may be described as external stimuli-responsive smart materials. To be more specific, SMPs remember their "permanent" shape but can be deformed and fixed to a new "temporary" shape mostly by vitrification or crystallization. Also, SMPs can reversibly recover their permanent shape from the temporary shape upon external stimuli. This shape memory effect of many reported SMPs is thermally triggered but some of the athermal stimuli-triggered SMPs have also been reported such as electro, magnetic, water, or photo active SMP composites. These unique material properties allow SMPs to be utilized in a various range of applications encompassing biomedical devices, mechanical components, temperature sensors, MEMS applications, transfer printing, droplet manipulating, and robotic grippers. Many of these applications employ the strain energy of SMPs in the way of accumulating energy in the temporary shape and releasing it by applying external stimuli. Designing a high strength dry adhesive is another example of exploiting SMPs. However, previously developed SMP dry adhesives are not capable of maintaining strong adhesion to flexible adherends since the SMP adhesives are in a rigid glassy state when adhering. Flexing an adherend causes it to peel from a rigid SMP dry adhesive due to the high stress concentration at the adhesive interface.

BRIEF SUMMARY

An SMP dry adhesive for attachment to a flexible adherend and a method of using the SMP dry adhesive are described in this disclosure. It is noted that the terms "SMP dry adhesive" and "dry adhesive" may be used alternatively throughout this disclosure.

The dry adhesive comprises a shape memory polymer having a glass transition temperature ($T_g$) above 25° C. and a compliant backing layer attached to the shape memory polymer. The shape memory polymer is configured to form a conformal and/or hermetic contact with a flexible adherend at temperatures at or above the $T_g$ and to retain the conformal and/or hermetic contact during flexing of the flexible adherend at temperatures below the $T_g$.

The method of use includes providing a dry adhesive comprising a shape memory polymer having a glass transition temperature ($T_g$) above 25° C. and a compliant backing layer attached to the shape memory polymer. The dry adhesive is heated to a temperature at or above the $T_g$. During the heating, the dry adhesive is contacted with a flexible adherend and pressure is applied thereto, such that the shape memory polymer makes conformal and/or hermetic contact with the flexible adherend over a contact region. The dry adhesive is cooled to a temperature below the $T_g$, such that the shape memory polymer is attached to the flexible adherend. During flexing of the flexible adherend at temperatures below the $T_g$, the shape memory polymer flexes with the flexible adherend and maintains the conformal and/or hermetic contact.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Described in this disclosure is the dual adaptation of an SMP dry adhesive, where "shape adaptation" is combined with "flexure adaptation," as explained below, to provide a strongly adherent dry adhesive with a low flexural rigidity. The shape adaptation enables the SMP dry adhesive to create a high adhesion to a flexible adherend via the shape memory effect, and the flexure adaptation ensures that the created adhesion is maintained in use, even after repeated flexing of the adherend.

Before the SMP dry adhesive is described in detail, the behavior of SMPs is briefly explained. An SMP may be deformed and fixed into a temporary shape that can be maintained until the SMP is stimulated to return to its previous "remembered" permanent shape. Most commonly the SMP is a thermosensitive SMP capable of undergoing either a glass or melting transition at a particular temperature, below which it is typically rigid and difficult to deform, and above which it is much softer and deforms easily. This transition may be generally be referred to as a glass transition, corresponding to a glass transition temperature ($T_g$), below which the SMP may be said to be in its glassy state, and above which the SMP may be said to be in its rubbery or deformable state. Typically, the glass transition encompasses a range of temperatures, as opposed to a single temperature, and thus the glass transition temperature $T_g$ may be referred to as a glass transition temperature zone $T_g$. Generally, an SMP in the glassy state below the $T_g$ exhibits a high storage modulus, and once the SMP is heated over the glass transition temperature ($T_g$), the storage modulus drops drastically and the SMP transforms to the rubbery state.

In this rubbery state, the SMP can make conformal contact with a smooth or a moderately rough surface and maximize the effective area of contact that creates van der Waals forces. The conformability, or shape adaptation, may be macroscopically apparent, such as in the case of a curved or otherwise non-flat surface, while also occurring on the molecular level, where intermolecular forces (e.g., van der Waals forces) generate a strong net adhesion between the SMP and the surface. The adhesion strength of an SMP may be proportional to the square root of the area that results from the conformal contact.

Figure 1A:
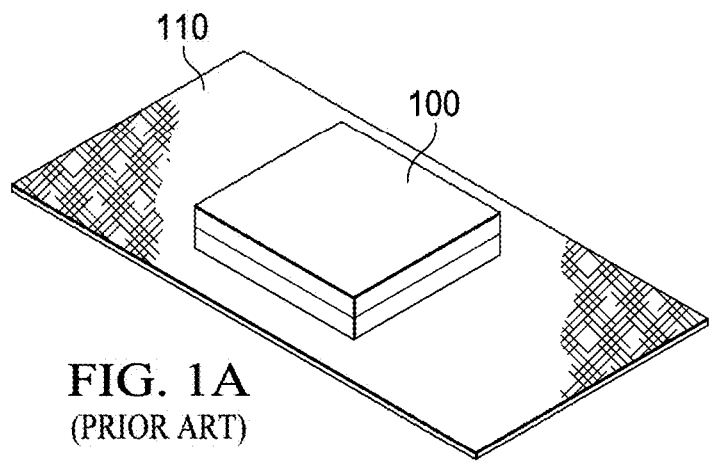
FIGS. 1A-1C show application of a prior art adhesive, which includes a rigid backing layer attached to a relatively thick SMP, to a flexible adherend; the prior art adhesive is unable to flex along with the flexible adherend, and thus the adherend detaches from the prior art adhesive in use.
Figure 1B:
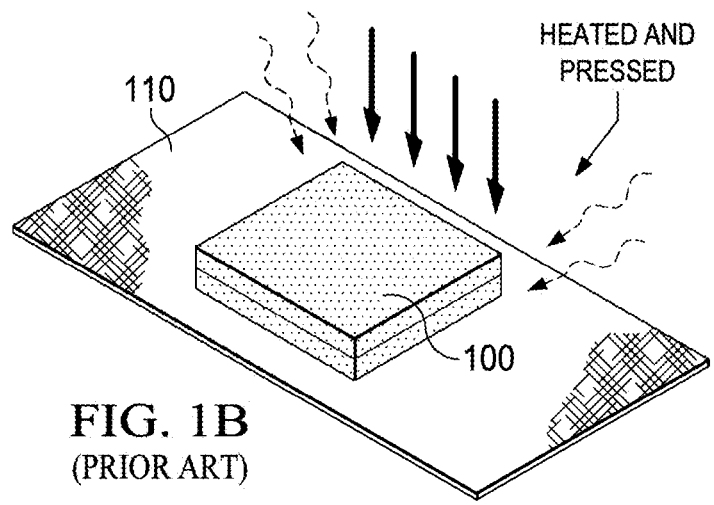

A previously developed adhesive 100 that includes a rigid backing layer 104 bonded to an SMP 102 is shown in FIGS. 1A and 1B, where the SMP 102 is heated above its $T_g$ for attachment to an adherend 110. Cooling the SMP 102 below its $T_g$, typically with loading, leads to a rigid configuration where the SMP 102 is fixed into its conformal, temporary shape, and flexing and/or peeling of the SMP adhesive 100 is not realizable, as shown in FIG. 1C.

However, that limitation is overcome here, as the inventive SMP dry adhesive is configured not only to make conformal and/or hermetic contact with a flexible adherend while in the rubbery state (i.e., at temperatures at or above the $T_g$), but also to retain the conformal and/or hermetic contact during flexing of the flexible adherend while in the glassy state (i.e., at temperatures below the $T_g$).

Figure 1C:
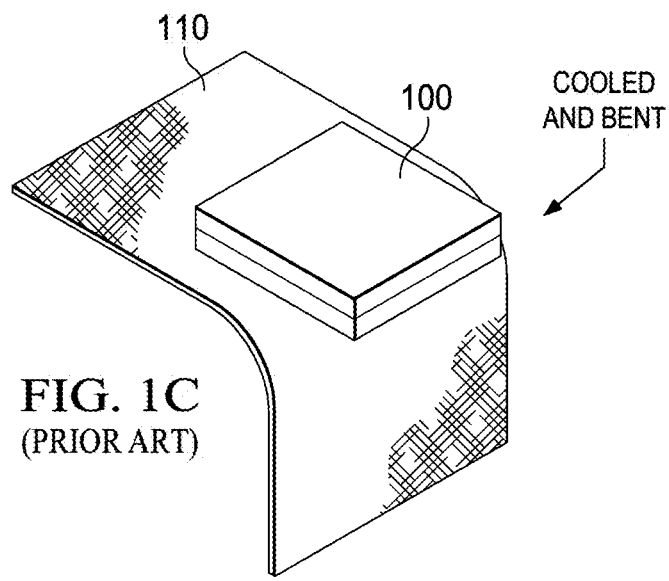
Figure 2A:
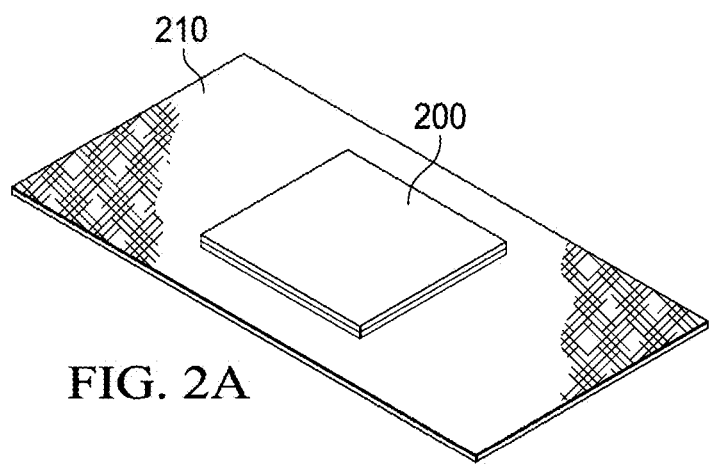
FIGS. 2A-2C show application of the SMP dry adhesive described in this disclosure to a flexible adherend; the SMP dry adhesive exhibits flexure an shape adaptation and is able to flex along with the flexible adherend, and thus the adherend remains attached to the SMP dry adhesive in use.
Figure 2B:
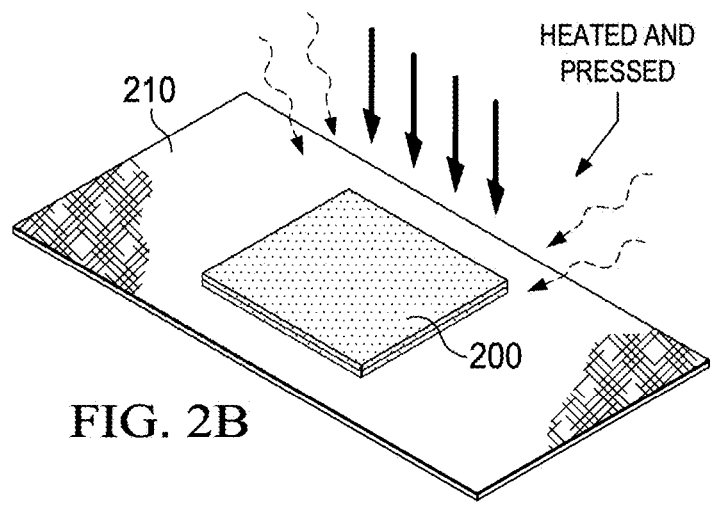
Figure 2C:
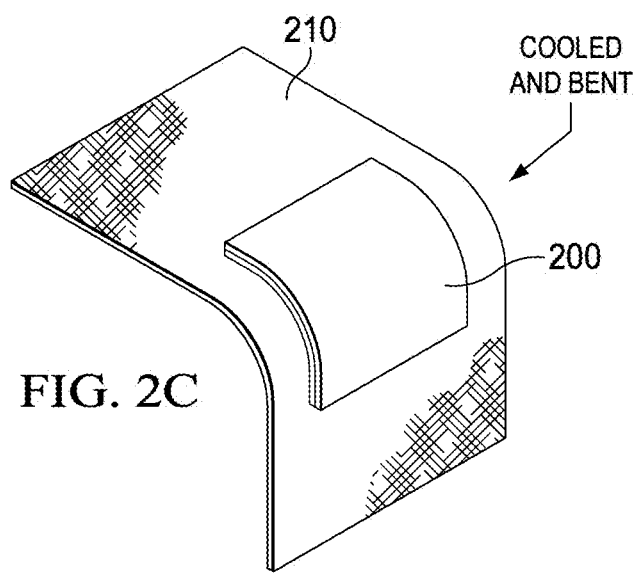
Figure 2D:
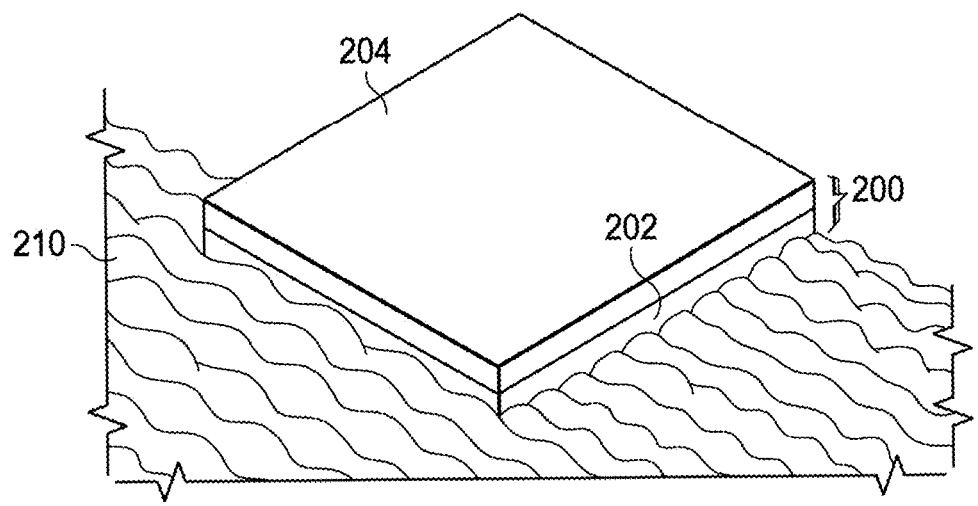
FIG. 2D shows a close-up view of the SMP dry adhesive of FIG. 2C, where shape adaptation of the SMP to the surface of the adherend can be observed.

FIGS. 2A-2D show the inventive SMP dry adhesive 200 and its capacity to attach to—and remain attached to—a flexible adherend 210, in contrast to the conventional rigid dry adhesive 100 shown in FIGS. 1A-1C. The SMP dry adhesive 200 includes a shape memory polymer 202 having a glass transition temperature ($T_g$) above room temperature and a pliable backing layer 204, which is attached or bonded to the shape memory polymer 202. The shape memory polymer 202 is configured to make a conformal and/or hermetic contact with the flexible adherend 210 at temperatures at or above the $T_g$ (see FIG. 2D) and to retain the conformal and/or hermetic contact during use of the flexible adherend 210 at temperatures below the $T_g$, as shown in FIG. 2C, where the use may include flexing, bending, twisting, curving or otherwise moving the adherend 210. Assuming that room temperature is normally 20-25° C., the $T_g$ of the SMP 202 is preferably above 25° C. Conformal contact is made when a surface of the SMP 202, while in the rubbery state, conforms to any surface contours and/or surface roughness of the flexible adherend over a region of contact ("contact region") between the SMP 202 and the flexible adherend 210. The conformal contact may also provide a hermetic seal that prevents external air, water, and/or other gases/liquids from penetrating the contact region, and thus the conformal contact may also or alternatively be described as a hermetic contact.

The shape memory polymer (SMP) 202 may take the form of a thin layer to promote the flexibility desired in the glassy state; however, data discussed below reveal that shape adaptation and the consequent adhesion may suffer at excessively low thicknesses. Accordingly, the SMP 202 may have a thickness selected to ensure sufficient flexure adaptation without comprising shape adaptation and adhesion strength. In one example, the SMP 202 may have a thickness less than about 500 microns to obtain the desired flexure adaptation and at least about 250 microns to ensure the desired shape adaptation and adhesion strength. It may be particularly advantageous for the shape memory polymer 202 to have a thickness in a range from about 250 microns to about 400 microns, in view of the data discussed below.

Figure 3:
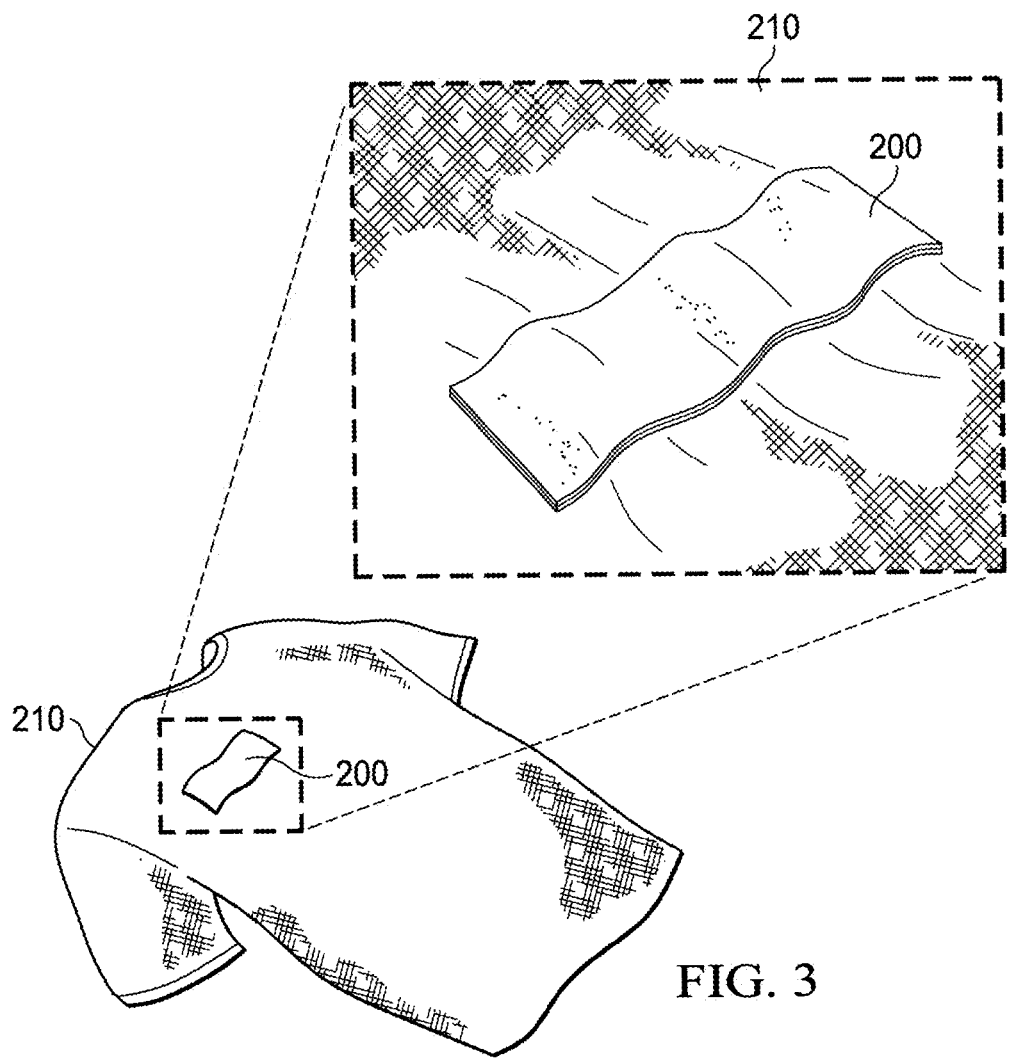
FIG. 3 shows an exemplary SMP dry adhesive making conformal and hermetic contact to a fabric, which is prone to flexing in use.

Referring to FIG. 3, the flexible adherend 210 to which the dry adhesive 200 is attached may comprise a fabric (e.g., denim) or another natural or synthetic material prone to flexing in use, such as leather, suede, vinyl and/or another polymer. A fabric may be understood to comprise a woven or knitted arrangement of natural and/or synthetic fibers. Exemplary fabrics may comprise cotton, linen, polyester, nylon, acrylic, rayon, silk, wool, and/or a blend of any of these. The flexible adherend 210 may be part or all of an item of apparel (clothing, shoe, baseball cap, etc.), as illustrated in FIG. 3, or part or all of an accessory, such as a purse or backpack. In some examples, the flexible adherend 210 may have a substantial surface roughness, e.g., due to its fibrous structure. The flexible adherend 210 may undergo washing or otherwise be exposed to (e.g., submerged in) water or another liquid without compromising the adhesion of the dry adhesive 200.

As indicated above, the SMP dry adhesive 200 includes a compliant backing layer 204 attached to the SMP 202. More specifically, the compliant backing layer 204 is bonded to a back side of the shape memory polymer 202 so that a front side of the shape memory polymer 202 is available for attachment to the flexible adherend 210. In order to be able to bend or curve along with the dry adhesive 200 as the flexible adherend 210 bends or curves, the compliant backing layer 204 may have a suitable thickness and flexural modulus, where smaller values of thickness may compensate for higher values of flexural modulus. For example, a compliant backing layer 204 with a thickness less than 250 µm may have a flexural modulus of less than 4 GPa, or a flexural modulus of less than 2 GPa with a thickness under 500 µm. Typically, the compliant backing layer 204 may have a thickness of at least about 150 µm, and no greater than 500 µm. In some examples, the flexural modulus of the compliant backing layer 204 may be as low as about 0.1 GPa (100 MPa). The flexural modulus may be determined according to the test methods set forth in ASTM D790 and/or ISO 178. In contrast to previous SMP dry adhesives, the backing layer 204 is not rigid and consequently is not formed from a metal or ceramic, such as aluminum or glass. The backing layer 204 may comprise a polymer, such as polyester. The backing layer 204 may comprise a fabric, such as a polyester fabric. Advantageously, the backing layer 204 may resist stretching deformation to protect the structural integrity of the shape memory polymer 202, and thus the backing layer 204 typically is not formed from an elastomer. The compliant backing layer 204 may be bonded to the SMP 202 by an adhesive, such as a spray adhesive, which may yield a lasting and/or permanent bond.

The $T_g$ of the SMP 202 is above room temperature (e.g., above 25° C.) to ensure that SMP is in the glassy state when in normal use as a dry adhesive 200. Preferably, the $T_g$ is above "ambient" temperature, which may be a small range when indoors (e.g., typically 20-25° C.) but may be a wider range when outdoors (e.g., from below 0° C. to about 38° C.). If, in use, the SMP dry adhesive 200 may undergo washing in a washing machine, where the water temperature may reach 32-43° C. in a typical warm water cycle, and 54° C. or higher in a typical hot water cycle, it may be beneficial to select a $T_g$ above the maximum water temperature. Thus, depending on the intended application, the $T_g$ of the shape memory polymer 202 may be at least about 35° C., at least about 40° C., at least about 45° C., or at least about 55° C. Typically, the $T_g$ is no higher than about 70° C. As discussed below, the $T_g$ may be tailored to a desired value or range during fabrication of the SMP 202.

The SMP 202 may comprise a polyepoxide, polyurethane, poly(ethylene-co-vinyl acetate), polycyclooctene, and/or another polymer. Generally speaking, the SMP 202 may be prepared from a formulation that includes a shape memory polymer precursor or resin (e.g., one or more monomers) and a crosslinking agent. The polymer properties and glass transition temperature may be varied by adjusting the mixing proportions of the SMP precursor and the crosslinking agent.

Increasing the proportion of the crosslinking agent in the formulation may enhance the flexibility of the SMP 202 in the glassy state and also reduce the glass transition temperature $T_g$ of the SMP 202. Generally speaking, the molar ratio of the SMP precursor to the crosslinking agent may be from about 1.0:1.0 to about 1.0:1.2 to promote the desired flexibility. Previous work has shown that it may be beneficial to prepare the SMP 202 from a SMP precursor that includes one or more monomers having a molecular weight (or an average molecular weight) of at least about 400 g/mol, or at least about 500 g/mol. For example, the shape memory polymer precursor may comprise a mixture of at least two epoxy monomers each having a different molecular weight, where an average molecular weight of the mixture is at least about 400 g/mol, or at least about 500 g/mol. The average molecular weight of a mixture including two monomers (e.g., monomer 1 and monomer 2) may be calculated by the following formula: (molecular weight of monomer 1)(molar proportion of monomer 1)+(molecular weight of monomer 2)(molar proportion of monomer 2)=average molecular weight. The preceding formula for average molecular weight may be expanded to include more than two monomers, as would be recognized by one of ordinary skill in the art.

A method of using a SMP dry adhesive is also described in this disclosure. Referring to FIG. 2A, the method includes providing a SMP dry adhesive 200 comprising (a) a shape memory polymer 202 having a glass transition temperature ($T_g$) above room temperature (e.g., above 25° C.) and (b) a compliant backing layer 204 attached to the shape memory polymer 202, where the dry adhesive 200, shape memory polymer 202, and compliant backing layer 204 may have any of the characteristics and properties described above or elsewhere in this disclosure. For example, as described above, the shape memory polymer 202 may have a thickness less than about 500 microns to obtain the desired flexure adaptation and at least about 250 microns to ensure the desired shape adaptation and adhesion strength. Preferably, the thickness may lie in a range from about 300 microns to about 425 microns.

To effect attachment of the dry adhesive 200 to a flexible adherend 210, the dry adhesive is heated to a temperature at or above the $T_g$, such that the shape memory polymer 202 reaches the rubbery state. While in the rubbery state, the shape memory polymer 202 is contacted with a flexible adherend 210 and pressure is applied to the dry adhesive 200, as shown in FIG. 2B. In response, the shape memory polymer 202 deforms and increases in contact area with the flexible adherend 210, so as to make conformal contact with the flexible adherend 210 over a contact region. The flexible adherend 210 may be supported by an underlying substrate, such as a rigid surface, during the attachment of the dry adhesive 200. As indicated above, the conformal contact may also provide a hermetic seal such that external air, water, and/or other gases/liquids cannot penetrate the contact region. In some examples, the conformal contact may be made while the flexible adherend 210 is fully or partly submerged in a liquid. Due to the flexibility of the compliant backing layer 204, the backing layer 204 may bend or flex as needed as pressure is applied to the dry adhesive 200.

Once the conformal contact has been made, the dry adhesive 200 is cooled to a temperature below the $T_g$, such that the shape memory polymer 202 transitions to the glassy state and is strongly attached to the flexible adherend 210. The pressure applied during heating above the $T_g$ may optionally be applied in full or in part during cooling to promote a robust attachment, and then the pressure may be removed.

Referring to FIG. 2C, during subsequent flexing (e.g., bending, curving, twisting, etc.) of the flexible adherend 210 while in use, the dry adhesive 200 (including both the SMP 202 and the compliant backing layer 204) flexes with the flexible adherend 210 and the shape memory polymer 202 maintains the conformal contact, in contrast to previous SMP dry adhesives. As described above, the shape memory polymer 202 is configured to make a conformal and/or hermetic contact with a flexible adherend at temperatures at or above the $T_g$ and to retain the conformal and/or hermetic contact at temperatures below the $T_g$, even during repeated flexing of the flexible adherend 210. While attached to the flexible adherend 210, the dry adhesive 200 may also or alternatively be washed or otherwise exposed to water or another liquid at a temperature below the $T_g$ without compromising the adhesion of the shape memory polymer 202.

For easy removal from the flexible adherend 210 after attachment, the SMP 202 may be heated to a temperature at or above the $T_g$ such that it returns to the rubbery state and is easily detached from the adherend 210. Alternatively, the SMP 202 can be peeled away from the adherend 210 in its glassy state due to its capacity for flexure, and after removal, the SMP 202 may retain an "imprint" of the contact surface of the flexible adherend 210 (unless or until heated to a temperature above the $T_g$), as discussed below. Under stress-free conditions, while in its rubbery state, the SMP 202 can return to its original permanent shape. The SMP 202 is not tacky, in contrast to traditional wet adhesives (and thus the "dry adhesive" nomenclature), and is therefore is resistant to surface contamination.

The heating indicated in FIG. 2B may be carried out using a heat source external to the shape memory polymer 202. For example, the heat source may comprise a household or industrial iron, heat gun, hot air blower, or hair dryer. Preferably, the shape memory polymer 202 is heated to a temperature of at least about 120% of the $T_g$, or at least about 160% of the $T_g$, but below a temperature at which the shape memory polymer may undergo degradation. A household or industrial iron may be particularly useful since it may simultaneously apply the requisite heat and pressure to the shape memory polymer 202. Due to the presence of the compliant backing layer 204, the iron may directly contact the backing layer 204 while a front surface of the SMP 202 is in direct contact with the flexible adherend 210. A manually applied pressure may be sufficient to induce the conformal and/or hermetic contact while the SMP 202 is in the rubbery state. Typically, a suitable pressure is in a range from about 0.05 atm to about 10 atm. Cooling to the temperature below the $T_g$ may entail active cooling (e.g., forced convective flow over the dry adhesive) or passive cooling.

Figures 4A, 4B, 4C:
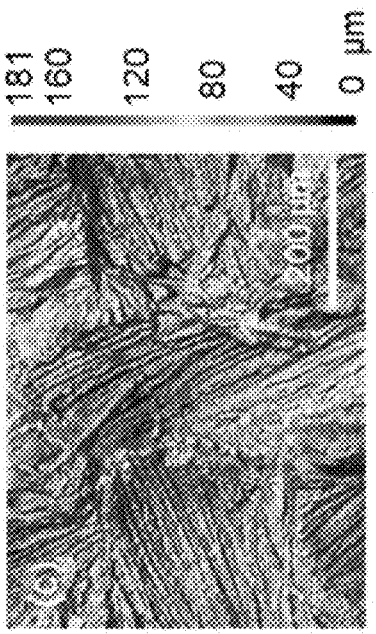
FIGS. 4A and 4B show scanning electron microscope (SEM) images of a front side of an SMP before attachment to a target fabric, and after attachment to and peeling from a target fabric in the glassy state, respectively, revealing strong shape adaptation.
FIG. 4C shows an optical profile of the SMP surface after being peeled from the target fabric while in the glassy state.
Figures 4D, 4E, 4F:
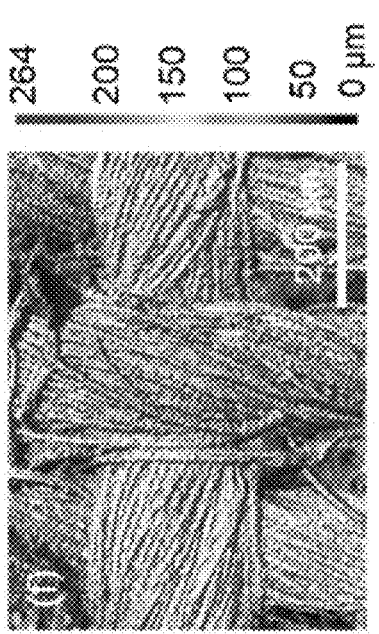
FIG. 4D shows a SEM image of the front side of the SMP after attachment, peeling, and then reheating above the $T_g$ to induce recovery of the original flat and smooth surface.
FIGS. 4E and 4F show a SEM image and an optical profile, respectively, of the target fabric made of woven polyester fibers.

The adhesion strength of the SMP dry adhesive 200 mainly comes from shape adaptation to the flexible adherend 210. FIG. 4A shows a scanning electron microscope (SEM) image (Hitachi S-2250N) of a front side (attachment surface) of a SMP 202 before adhering. The SMP is first heated to the rubbery state, then pressed to make conformal contact with the flexible adherend, which in this example is a target fabric comprising 65% polyester and 35% cotton, as shown in FIGS. 4E and 4F. Next, the SMP is cooled down to the glassy state. The SMP dry adhesive can be pulled from the target fabric if sufficient force is applied to overcome the adhesion of the SMP, as is done in this example. After peeling, the SMP retains its conformal temporary shape, as can be observed in FIGS. 4B and 4C, which show the front side of the SMP while still in the glassy state. This temporary shape fixing demonstrates that the SMP has a strong shape adaptation capability, which increases the contact area and maximizes the adhering force. FIG. 4D shows the front side of the SMP after reheating above the $T_g$, at which point the SMP recovers its original permanent shape. This permanent shape recovery may also enhance the reusability of the dry adhesive. FIGS. 4C and 4F show three-dimensional (3D) optical profilometric images, which are captured using a VK-X1000 laser scanning confocal microscope (Keyence) with the laser confocal scanning method. A negative profile can be observed in FIG. 4C, which represents the front side profile of the SMP after peeling from the fabric, whereas FIG. 4F shows a profile of the target fabric surface. Notably, the front side profile of the SMP surface is almost identical to the reverse profile of the fabric. A more quantitative comparison may be obtained from comparing different roughness measures of the SMP dry adhesive and the target fabric surface, where a percentile similarity may be defined as the ratio between the roughness of the SMP surface and the roughness of the target fabric. Equations for arithmetical mean height, root mean square height, developed interfacial area ratio, and root mean square gradient are used where A is the area of the x-y plane, and z(x, y) is the height value at a specific point (x, y). Roughness values defined as $S_a$, $S_q$, $S_dr$, and $S_{ag}$ of a front side of a flat, newly made SMP are small, and the corresponding percentile similarities are 7, 7, 5, and 19%. However, after heating, pressing on the target fabric, cooling, and peeling the SMP from the fabric while in the glassy state, the percentile similarities increase to 95, 89, 55, and 73%, respectively. Consequently, 3D optical profiling as shown in FIG. 4C quantitatively reveals the shape adaptation at the microscale that creates the strong dry adhesion between the SMP and the fabric surface.

Fabrication of the dry adhesive may include a first step of preparing a SMP precursor formulation by mixing together a shape memory polymer precursor or resin (e.g., one or more monomers) and a crosslinking agent, as described above. The properties and glass transition temperature of the cured SMP may be varied by adjusting the mixing proportions of the SMP precursor and the crosslinking agent. The SMP may be prepared in the form of a thin layer suitable for use as part of the dry adhesive by employing a molding process or a rolling process, as described below.

Figure 5:
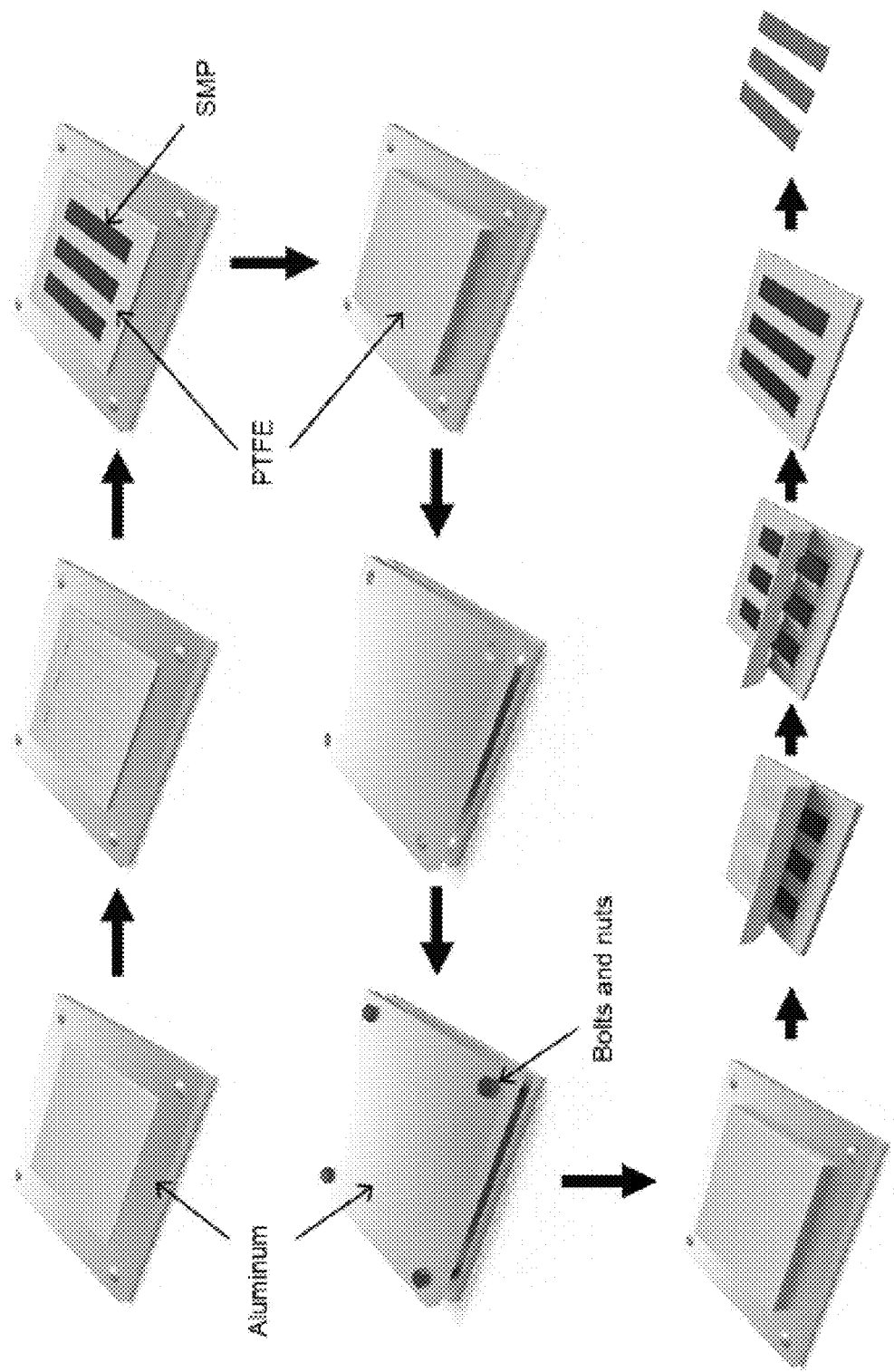
FIG. 5 illustrates a molding process for forming multiple SMPs, each in the form of a thin layer.

The molding method may entail creating a mold using a stack of sheets comprising polytetrafluoroethylene (PTFE) or another low friction material to enable easy release from the mold. A first sheet of PTFE may define a base of the mold, a second sheet of PTFE overlaid on the first sheet and including one or more openings of a predetermined size and thickness (e.g., from about 125-1500 μm, 250-500 μm, or from about 300-425 μm) may define walls of the mold (and thus the shape and thickness of the one or more SMPs to be formed), and a third sheet of PTFE overlaid on the second sheet may define a top of the mold. Referring to FIG. 5 and following the arrows, the first sheet may be placed on a rigid substrate (e.g., an aluminum plate or block), and then the second sheet with the one or more openings may be placed on the first sheet, forming an assembly, which may be heated at a temperature in a range from about 100° C. to about 140° C. The SMP precursor formulation may be poured into the opening to fill the mold. Any air bubbles in the formulation may be removed, e.g., using a pipette. The third sheet, which is typically the thickest of the three sheets, may be placed over the second sheet and the SMP precursor formulation in the mold. Finally, a second aluminum block may be placed over the third PTFE sheet, and overhanging portions of the second aluminum block may be bolted to exposed portions of the aluminum block underlying the first sheet. The pressure applied to bolt the blocks together may be sufficient to squeeze out any excess SMP from inside the mold. The SMP is then thermally cured, e.g., at 120° C., or more generally from 100-140° C., for 3 hours, or more generally from 2-4 hours. The heat may be provided by a hot plate underlying the aluminum block. After curing, the bolts and the two aluminum blocks may be removed and the first and second PTFE sheets may be peeled off. Finally, the SMP in the form of a thin layer may be peeled from the third PTFE sheet, preferably after heating to 100-140° C., e.g., to 120° C. on the hot plate.

Figures 6A, 6B, 6C:
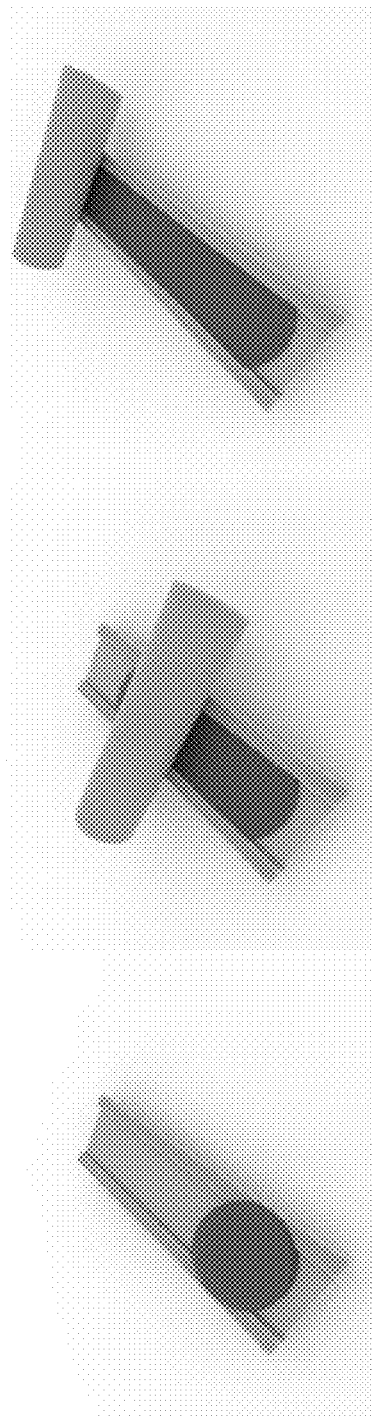
FIGS. 6A-6C illustrates a rolling process for forming a SMP in the form of a thin layer.

The rolling process to prepare the SMP may entail providing an elongated container or mold for rolling. For example, a sheet comprising PTFE or another low-friction material may be placed on a surface, and two low-friction strips of a suitable thickness may be aligned on opposing edges of the sheet to create support rails for the roller and to define a cavity therebetween, thereby forming the elongated container or mold. The SMP precursor formulation may be poured over the PTFE sheet and into the cavity, as illustrated in FIG. 6A, and then a roller (e.g., a glass applicator) may be rolled along the rails and over the precursor to form a thin layer of the SMP that has a thickness determined by the thickness of the strips (rails), as shown in FIGS. 6B and 6C. It may be beneficial to continue rolling while curing until the adhesion between the precursor and the PTFE layer becomes larger than the surface tension. The SMP may undergo curing at a temperature from 100-140° C., e.g., 120° C., which may be carried out on a hot plate. The curing time is typically 2-4 hours (e.g., 3 hours). After curing is over, the SMP layer may be peeled from the PTFE sheet.

Figures 7A, 7B:
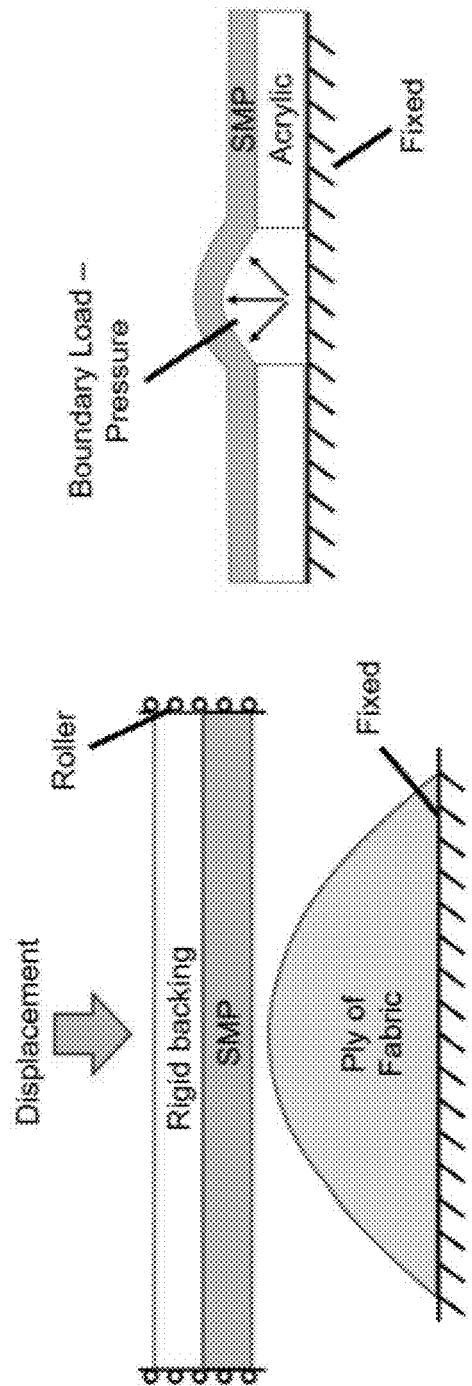
FIGS. 7A and 7B show constraints and loading conditions for numerical analysis of the contact length between a simplified 2D model of a rubbery state SMP layer and a ply of fabric, and a clamped circular SMP plate blister test, respectively.
Figure 8A:
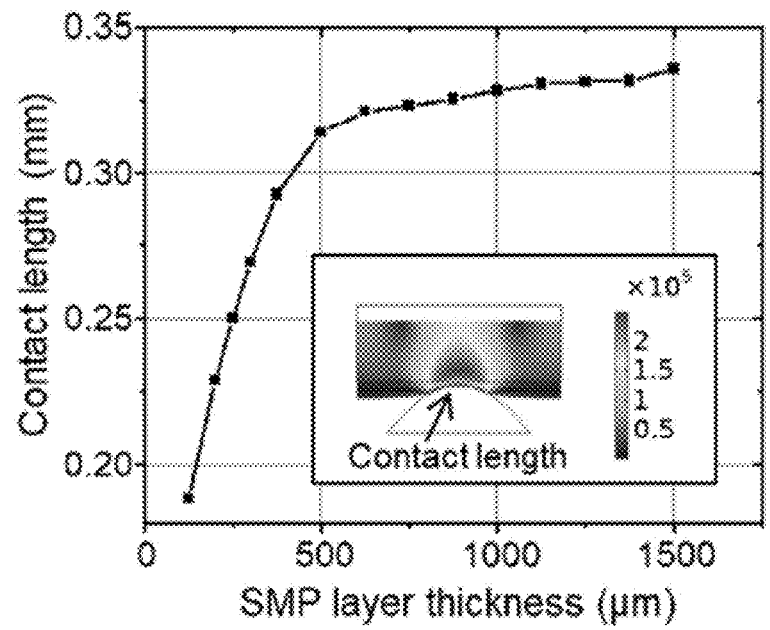
FIG. 8A shows numerical analysis results for shape adaptation of an SMP adhesive with varying thickness, in particular, a plot of the calculated contact length between a flat SMP and a parabolic ply of fabric to show the thickness-dependent contact length, and thus the shape adaptation; the SMP is pressed on the ply of fabric, and the contact length is recorded when the maximum von Mises stress reaches 250 kPa.

3D shape adaptation of the SMP is numerically studied to investigate the effect of the SMP thickness. Specifically, the contact length between a simplified two-dimensional (2D) model of a rubbery-state SMP layer and a ply of fabric is computed with varying thickness of the SMP layer (COMSOL Multiphysics). The boundary condition is depicted in FIG. 7A, where the bottom boundary of the parabolic ply of fabric is fixed, side boundaries of the SMP layer involve rollers, and a displacement is applied to the SMP layer with a rigid backing until its maximum internal von Mises stress reaches 250 kPa. The density, Young's modulus, and Poisson's ratio of the SMP and the fabric are 1120 kg/m$^3$, 2 MPa, and 0.35 and 1300 kg/m$^3$, 4.03 GPa, and 0.3, respectively. FIG. 8A presents the contact length between the SMP layer and the ply of fabric as a function of the thickness of the SMP layer. When the SMP layer thickness is below 500 μm, the contact length increases drastically as the SMP layer becomes thicker due to the rapidly decreasing structural rigidity of the SMP layer. However, the contact length slowly increases after the SMP layer thickness of 500 μm. These numerical results provide one of the critical design criteria of the SMP dry adhesive that a higher adhesion strength is achievable as the SMP layer is thicker but it is not worth over 500 μm.

Figure 8B:
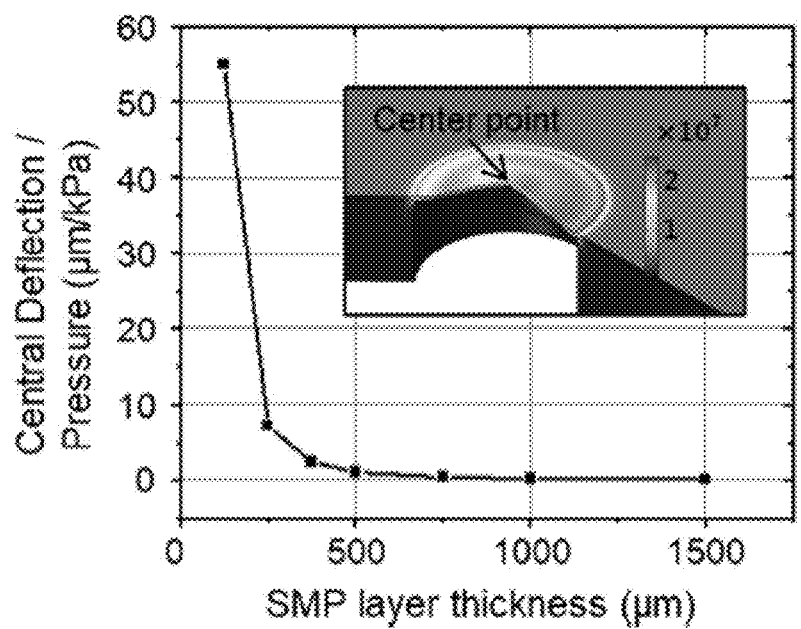
FIG. 8B shows numerical analysis results for flexure adaptation of an SMP adhesive with varying thickness, in particular, a plot of the computed slope of the linear relationship, shown in FIG. 9, between central deflection and pressure for a circular SMP blister test model to investigate the thickness dependence of flexure adaptation; the SMP model is deformed until the pressure reaches 150 kPa.
Figure 9:
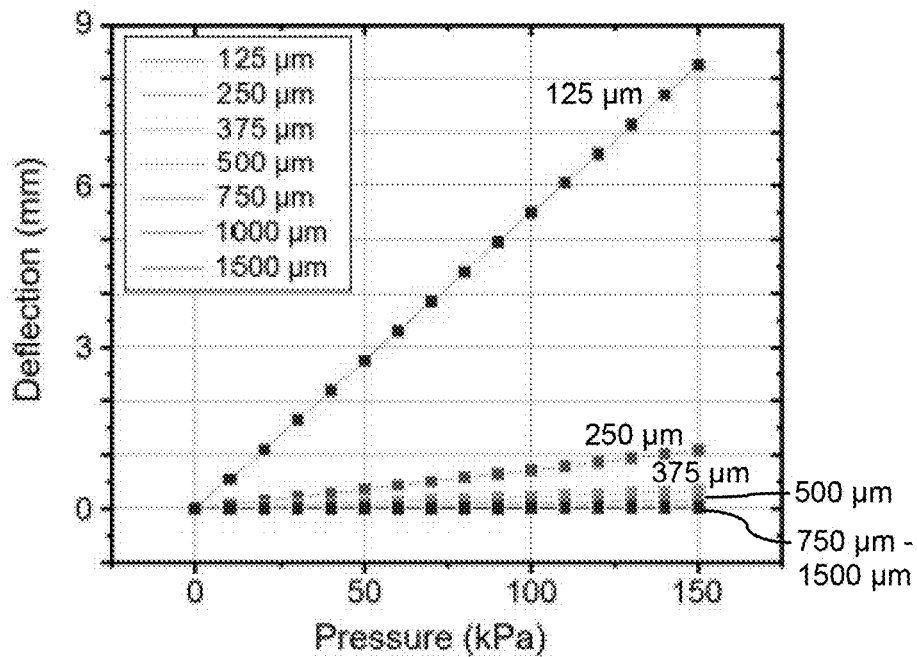
FIG. 9 shows a plot of numerically computed central deflection of the SMP blister test model as a function of applied pressure for thicknesses ranging from 125 μm to 1500 μm.

To investigate the thickness effect on the flexure adaptation, the 2D axis-symmetric numerical analysis of a clamped circular plate blister test is conducted. The blister test model generates the central deflection of a clamped circular SMP layer as a function of its thickness upon a constant pressure. The boundary condition is shown in FIG. 7B where the bottom boundary of the acrylic plate is fixed and the constant pressure is applied at the lower boundary of the SMP layer through the center opening of the acrylic plate. FIG. 9 shows the central deflection of the SMP layer with different thickness values in the pressure range of 0-150 kPa. Here, the slope of each curve for each thickness corresponds to the central deflection increase with respect to pressure increase, which is labeled for the y-axis in FIG. 8B. It is noteworthy that this slope is the measure of the flexure adaptation in this work since the higher value of the central deflection increase per pressure increase indicates that the SMP layer deforms with lower effort. In this sense, the graph in FIG. 8B shows the enhanced flexure adaptation of thinner SMP layers. Additionally, the theoretical computed central deflection of the SMP blister test model as a function of applied pressure supports the results of the numerical computation.

Figure 10:
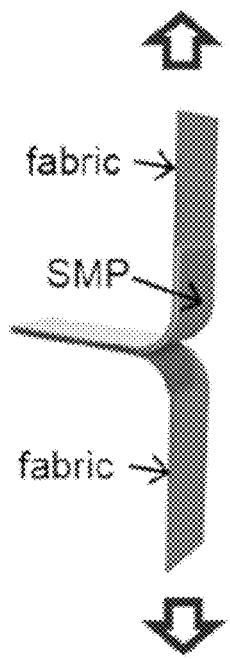
FIG. 10 is a schematic illustrating a T-Peel test, where the SMP dry adhesive and attached flexible adherend (fabric sample) are pulled apart in a tensile test apparatus to evaluate adhesion as a function of SMP thickness.

The numerical results of the dual adaptation of the SMP dry adhesive are compared with experimental data. For the shape adaptation, the T-Peel test method, which is commonly used to measure a separation peeling strength of two bonded flexible materials, is employed. Two 6×1 in fabric strips are prepared. Since one strip is a backing fabric that is permanently glued to an SMP layer, the adhesion strength is measured on the other side (front side) of the SMP layer. The SMP layer is heated on a hot plate at 120° C. and aligned with the other target fabric strip and the preload is applied using a flat wooden block. The ends of both fabric strips are clamped using wedge action tensile grips of a tensile tester (Instron universal testing system) as shown schematically in FIG. 10. The experiments follow the procedure listed in the ASTM standard test method for the peel resistance of adhesives (T-Peel test). The peeling load versus peeling distance is measured, while the separation speed is fixed at 10 in./min. The adhesion strength for the sample is calculated by averaging the peeling load values between the peeling distance from 20 to 140 mm.

Figure 11:
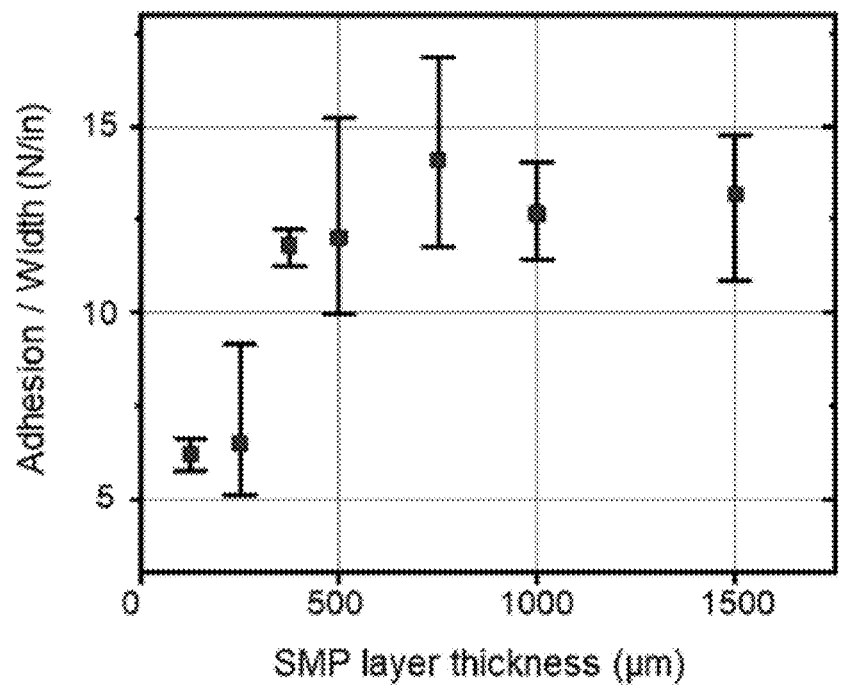
FIG. 11 is a plot of adhesion per width as a function of SMP thickness based on the T-Peel test results, where the tests are conducted three times per thickness; the results show a thickness-dependent trend consistent with the numerical analysis results for shape adaptation.

The same experimental procedure is repeated three times for each different SMP layer thickness to investigate the effect of the SMP layer thickness on the adhesion strength. In FIG. 11, the average adhesion strength of the 125 μm thick SMP layer is 6.2 N/in, whereas that of 750 μm thick SMP layer is 14.1 N/in. The adhesion strength is nearly saturated over the thickness of 375 μm and the difference is within the error range. The observed results are explained primarily using the thickness-dependent shape adaptation. However, the thickness of SMP layers also influences the results in a different way since a thicker SMP layer is less bendable to retain the T-shape during T-Peel tests. Furthermore, microdusts collected on the target fabric surface due to electrostatic forces may adversely cause relatively scattered adhesion strength data although each average adhesion strength value here is from three fresh samples. Nevertheless, these experimental data qualitatively support the numerical analysis results of the thickness-dependent adhesion strength of SMP layers based on the shape adaptation shown in FIG. 8A. It is worthwhile to note that the adhesive strength degradation of a single sample is observed as the T-Peel test is repeated due to accumulated microdusts presumably from a target fabric. The complete cleaning of microdusts from the SMP surface between test cycles is challenging since the adhesion between individual microdusts and the SMP surface should effectively be overcome during cleaning.

Figure 12:
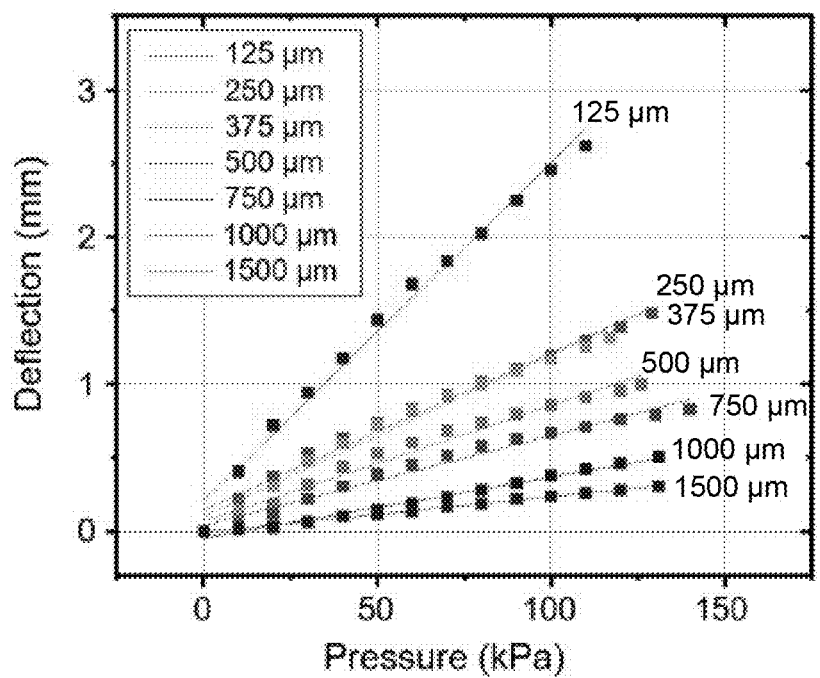
FIG. 12 shows a plot of experimentally obtained central deflection of the SMP blister test sample as a function of applied pressure, where the SMP thickness varies from 125 μm to 1500 μm.
Figure 13:
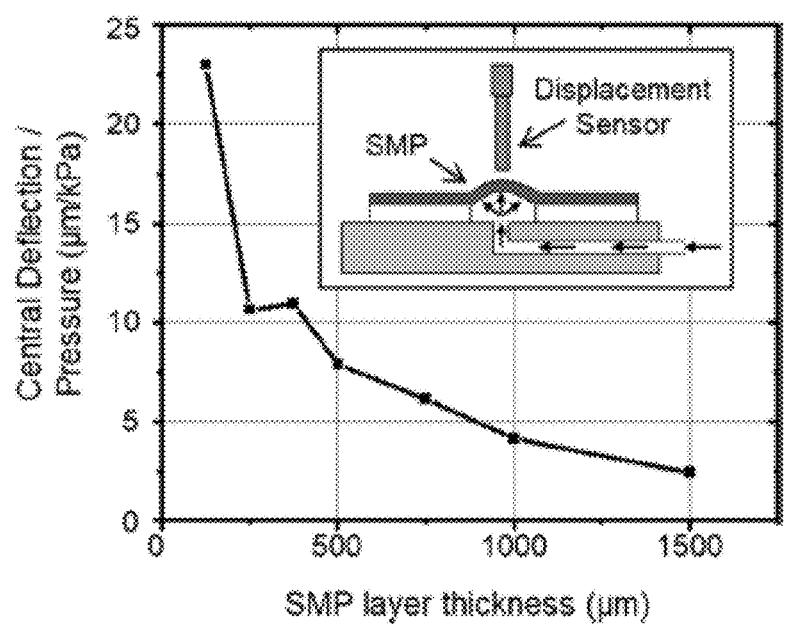
FIG. 13 shows a plot of the blister test results, where the increase in the central deflection per pressure with SMP thickness are consistent with the numerical analysis results for the flexure adaptation; the inset illustration represents the inflated SMP layer upon pressuring.

For the flexure adaptation, a blister test setup similar to the numerical model of FIG. 8B is built and the thickness effect is experimentally measured. Using the test setup, the central deflection of the circular 125-1500 μm thick SMP layers is measured every 10 kPa pressure increment, as shown in FIG. 12. The slopes of the linear regression for different thickness SMP layers are collected and depicted in FIG. 13. The y-axis of the graph indicates the central point deflection per pressure applied. The higher the y-value, the lower pressure is needed to achieve the same deflection, indicating that the SMP layer is deformed with less effort of pressure. These experimental data show the identical thickness-dependent flexure adaptation trend with the numerical results shown in FIGS. 8B and 9. The thinner an SMP layer is, the better flexure adaptation is achieved.

Figure 14:
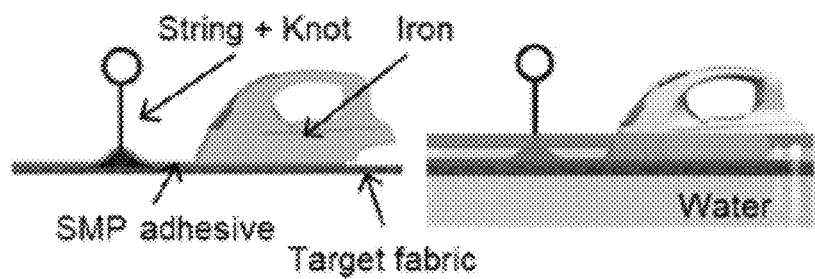
FIG. 14 illustrates an SMP dry adhesive being ironed onto a target dry or wet fabric.
Figure 15:
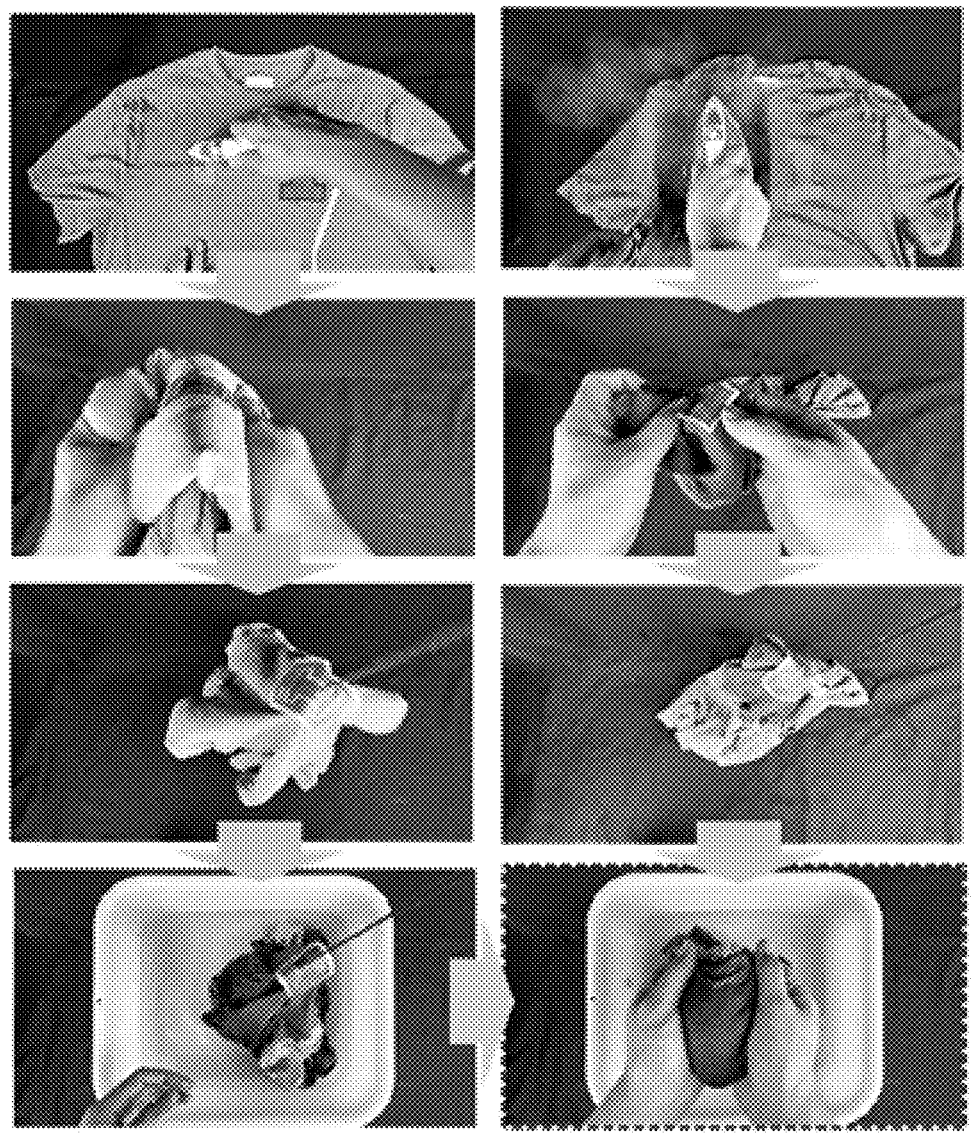
FIG. 15 shows, beginning with the top left-column image, attachment of an SMP dry adhesive to a t-shirt by ironing. The images show, following the arrows, that the SMP dry adhesive: remains attached while the t-shirt is formed or flexed due to the flexure adaptation; shows a high adhesion to the t-shirt while pulling on a string embedded under the backing layer of the dry adhesive; does not lose its dry-state adhesion even after it is submerged; and can be peeled off without damaging the t-shirt. The right-column images show the wet-state adhesion of the SMP adhesive, which is initially attached to a submerged t-shirt.

FIG. 14 demonstrates the fabric adhesive applications of the SMP dry adhesive. The SMP dry adhesive adheres to not only dry but also wet, submerged target fabrics due to the shape adaptation, which allows the conformal and hermetic contact with adherends. In an experiment, an SMP dry adhesive composed of an SMP layer with a backing fabric is ironed on a target fabric under dry as well as wet conditions, as illustrated in FIG. 14. A knot of a string is embedded inside the SMP dry adhesive for a subsequent pulling demonstration. The dry-state adhesion is shown in the left-column images, following the arrows in FIG. 14. In the top image, during dry-state ironing, the shape adaptation of the dry adhesive creates a strong dry adhesion on a target fabric. The next image shows the ability of the dry adhesive to comply with the target fabric flexing due to the flexure adaptation during adhering. In the subsequent image where the target fabric is lifted, the dry adhesion strength of the dry adhesive is roughly estimated. Its dry adhesion involves a conformal and hermetic adhesive contact due to the strong shape adaptation, and thus the same dry adhesion strength is retained even if the SMP dry adhesive becomes wet, as shown in the following image. The last image (bottom right) presents that the target fabric is not contaminated after peeling the dry adhesive, which confirms the damage-free adhesive capability of the dry adhesive. The right-column images summarize the wet-state, underwater adhesion of the SMP dry adhesive. The shape adaptation of the SMP is also possible on a submerged adherend surface since a preload squeezes out liquid between the SMP and adherend surfaces, yet their conformal and hermetic adhesive contact is maintained via shape fixing of the SMP. In a practical example, a name tag or other identification may be attached to a military uniform (or other apparel, such as an athletic jersey) using an SMP, where the name tag may also function as the backing layer described above. Based on the properties of the SMP dry adhesive demonstrated in FIG. 15, the name tag may stay on the uniform with high adhesion strength even under flexing and wrinkling conditions in dry and wet environments. The presented SMP dry adhesive is especially useful in cases like this when the tag may be required to be attached to and then removed from fabrics with no contamination.

Experimental Example: Fabrication of SMP Dry Adhesives

Figure 16:
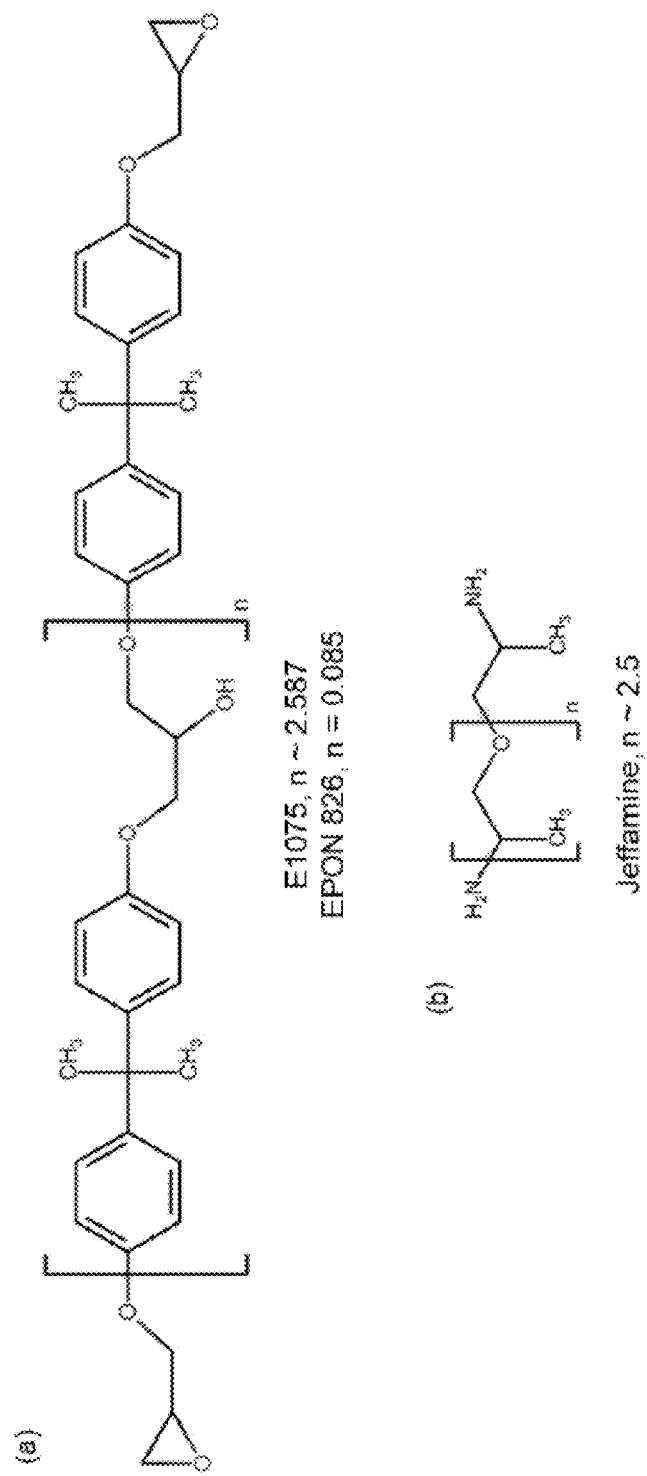
FIG. 16 shows the chemical structures of exemplary SMP precursor monomers E1075 (n~2.587) and EPON 826 (n=0.085), and an exemplary crosslinker Jeffamine (n~2.5), which are employed in experimental examples to fabricate the SMP dry adhesive.

Preparing a SMP precursor formulation: In this example, a mixture of poly(bisphenol A-co-epichlorohydrin), glycidyl end-capped with a molecular weight of 1075 g/mol (hereafter E1075) from Sigma-Aldrich and EPON 826, a liquid bisphenol A based epoxy resin from Miller-Stephenson are preheated at 120° C. in an oven. Once they are completely melted, Jeffamine D-230 poly(propylene glycol)bis(2-aminopropyl) ether (hereafter Jeffamine) with an average molecular weight of 230 g/mol from Huntsman is mixed into them. The weight-based ratio of E1075:EPON 826:Jeffamine is 0.940:1.000:1.004. The chemical structures for each component are illustrated in FIG. 16.

Fabrication of SMP by molding: FIG. 5 depicts an exemplary molding method for fabricating the SMP in the form of thin layers. In one example of the molding method, a first PTFE sheet (e.g., 1 mm thick) is placed on an aluminum block. A second sheet of PTFE is placed over the first PTFE sheet, the thickness of which may be from about 125 μm to about 1500 μm. The second PTFE sheet has multiple openings, which in this example are 3×0.75 in in area. The openings may be formed by cutting using a laser cutter (e.g., Epilog Mini laser cutter) or another suitable tool. The assembly is then heated at 120° C. on a hot plate and the SMP precursor is poured over the openings of the second PTFE sheet. Any air bubbles inside the precursor are removed using a pipette. A third PTFE sheet with a thickness of, in this example, 3/16 in is placed on top of the second PTFE sheet and the SMP precursor. Compared to the other two PTFE sheets, the third PTFE sheet is the thickest to prevent any bending that can hinder the formation of a uniformly thick SMP layer. Then the top aluminum block is placed over the third PTFE sheet and four corners of the two aluminum blocks are bolted to squeeze out any excess SMP inside the mold. The SMP is then cured at 120° C. on a hot plate for 3 hours. After curing, the bolt and two aluminum blocks are removed and the first and second PTFE sheets are peeled off. Lastly, the thin SMP layer is peeled off from the third PTFE sheet after heating it at 120° C. on the hot plate.

Fabrication of SMP by rolling: In the case of bulk manufacturing, the molding method may be slower than the exemplary rolling method depicted in FIGS. 6A-6C. In one example of the molding method, a PTFE sheet is placed first, and two guide PTFE strips are aligned on the two edges facing each other. The precursor is then poured over the PTFE sheet and then a glass applicator rolls over the precursor to form a thin layer of the SMP. Additional rolling may be needed while curing until the adhesion between the precursor and the PTFE layer becomes larger than the surface tension. The SMP is cured at 120° C. on a hot plate for 3 hours. After curing is over, the SMP layer is peeled off from the PTFE sheet.

Assembly of the dry adhesive: In this example, one side of a backing polyester fabric is glued to a thin layer of the SMP using a spray adhesive such as 3M Hi-Strength 90 Spray Adhesive, thereby bonding a back side of the SMP to the backing fabric, leaving the other side (front side) available for reversible attachment to a flexible adherend.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A dry adhesive for attachment to a flexible adherend, the dry adhesive comprising:
a shape memory polymer layer having a glass transition temperature ($T_g$) above 25° C.;
an adhesive; and
a compliant backing layer bonded to the shape memory polymer layer by the adhesive,
wherein the shape memory polymer layer is configured to form a conformal and/or hermetic contact with a flexible adherend at temperatures at or above the $T_g$ and to retain the conformal and/or hermetic contact during flexing of the flexible adherend at temperatures below the $T_g$, and
wherein the compliant backing layer has a flexural modulus of less than 4 GPa and a thickness less than 250 microns.

2. The dry adhesive of claim 1, wherein the shape memory polymer layer has a thickness from about 250 microns to about 500 microns.

3. The dry adhesive of claim 1, wherein the compliant backing layer comprises a polymer.

4. The dry adhesive of claim 1, wherein the compliant backing layer comprises a fabric.

5. The dry adhesive of claim 1, wherein the $T_g$ is at least about 35° C.

6. The dry adhesive of claim 1, wherein the flexible adherend comprises a fabric.

7. The dry adhesive of claim 6, wherein the fabric comprises denim, cotton, linen, polyester, nylon, acrylic, rayon, silk, wool, leather, suede, vinyl and/or combinations thereof.

8. The dry adhesive of claim 2, wherein the thickness of the shape memory polymer layer is in a range from 250 μm to 400 μm.

9. The dry adhesive of claim 1, wherein the shape memory polymer layer is prepared from a formulation comprising a shape memory polymer precursor and a crosslinking agent, and
wherein a molar ratio of the shape memory polymer precursor to the crosslinking agent is from 1.0:1.0 to 1.0:1.2.

10. A dry adhesive for attachment to a flexible adherend, the dry adhesive comprising:
a shape memory polymer layer having a glass transition temperature ($T_g$) above 25° C.;
an adhesive; and
a compliant backing layer bonded to the shape memory polymer layer by the adhesive,
wherein the shape memory polymer layer is configured to form a conformal and/or hermetic contact with a flexible adherend at temperatures at or above the $T_g$ and to retain the conformal and/or hermetic contact during flexing of the flexible adherend at temperatures below the $T_g$, and
wherein the compliant backing layer comprises a fabric.

11. A dry adhesive for attachment to a flexible adherend, the dry adhesive comprising:
a shape memory polymer layer having a glass transition temperature ($T_g$) above 25° C.;
an adhesive; and
a compliant backing layer bonded to the shape memory polymer layer by the adhesive,
wherein the shape memory polymer layer is configured to form a conformal and/or hermetic contact with a flexible adherend at temperatures at or above the $T_g$ and to retain the conformal and/or hermetic contact during flexing of the flexible adherend at temperatures below the $T_g$, and
wherein the shape memory polymer layer is prepared from a formulation comprising a shape memory polymer precursor and a crosslinking agent, and
wherein a molar ratio of the shape memory polymer precursor to the crosslinking agent is from 1.0:1.0 to 1.0:1.2.

* * * * *